H. FISH.
CUTTING TOOL.
APPLICATION FILED JUNE 12, 1917.
1,271,299.
Patented July 2, 1918.
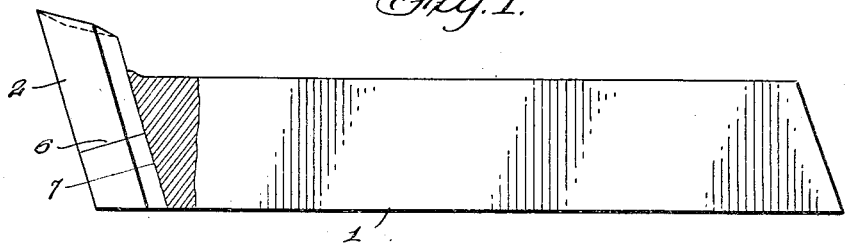
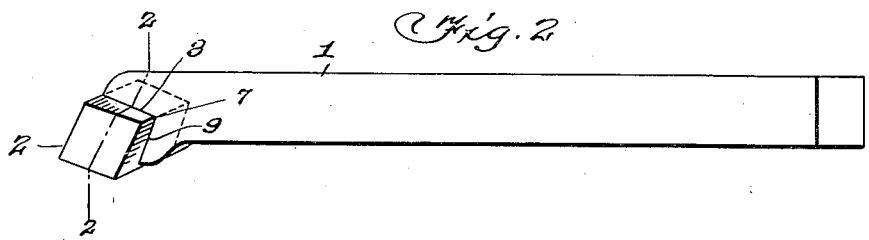
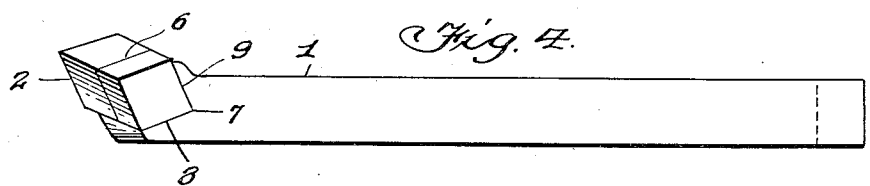
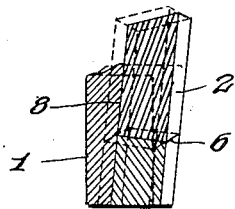
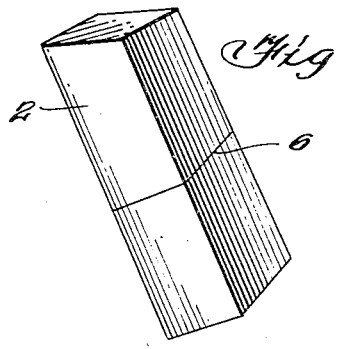
Harold Fish  Inventor
By his Attorneys
Mock & Blum

UNITED STATES PATENT OFFICE.

HAROLD FISH, OF STRATFORD, CONNECTICUT, ASSIGNOR TO THE READY TOOL COMPANY, OF BRIDGEPORT, CONNECTICUT, A CORPORATION OF CONNECTICUT.

CUTTING-TOOL.

1,271,299.  Specification of Letters Patent.  Patented July 2, 1918.

Application filed June 12, 1917. Serial No. 174,137.

*To all whom it may concern:*

Be it known that I, HAROLD FISH, a citizen of the United States, residing at Stratford, in the county of Fairfield and State of Connecticut, have invented certain new and useful Improvements in Cutting-Tools, of which the following is a specification.

My invention relates to cutting tools and more particularly to that type of cutting tools wherein the cutting member is formed from a material different from the body of the tool.

More especially my invention relates to cutting tools in which the cutting agent is a hard and brittle alloy such as the material known as stellite, composed of an alloy of nickel, cobalt and chromium, and similar alloys.

In the customary application of the material stellite to cutting tools great waste is occasioned from the nature of the alloy itself and the difficulty in applying the small portions thereof.

I have devised a method of using this material in a cutting tool of the ordinary form in a very economical and efficient manner as is more fully illustrated in the drawings hereto annexed.

Figure 1 shows a side elevation of the cutting tool, partly in section.

Fig. 2 shows a top view of the tool.

Fig. 3 shows a perspective view of a section along the line 2—2 of Fig. 2.

Fig. 4 shows a bottom view of the tool.

Fig. 5 shows a perspective view of the cutting portion of the tool alone.

The cutting tool comprises the usual shank 1 adapted to be embraced by the usual tool holder on the top of which the cutting member 2 is placed. The top of said shank is formed with a V-shaped recess to receive the cutting member. For the purpose of forming the cutting member I take a section of a rectangular rod of stellite and join thereto a preferably equal length of tool steel having the same shape, which is rectangular in this embodiment, by welding along the line 6. I then take the welded member of stellite and tool steel and join the entire member bodily to the shank of the cutting tool 1 in the V-shaped recess 7 by again welding along the sides 8 and 9 of said member, the welding being preferably along the entire length of these sides, except of course, for the projecting portion.

The line 6 is within the region of welding, between the cutting member and the shank, so that the stellite, besides being welded to the backing of tool steel, is also welded at a part thereof, to the shank of the tool. It is advisable in the manufacture of said cutting member to have the grain of the stellite come nearly parallel with the axis of the shank of the tool holder as I find that the most efficient results are produced when the cutting edge of the stellite has the grain thereof in this position, so that the grain is substantially at right angles to the work. The lines shown in Fig. 3 do not represent the grain of the alloy, but are merely conventional hatching lines.

It will readily be seen that in practice the cutting edge of this tool will employ practically the entire portion of stellite welded therein before the capacity of the tool is exhausted so that very little of the more expensive stellite material is wasted. There is a further advantage in having the harder and more brittle stellite reinforced with a backing of a softer and more elastic tool steel or a metal less brittle than the cutting alloy.

I have shown herein this cutting tool adapted to the material stellite but it is obvious that this invention is not restricted thereto but may be used with other cutting alloys also, and that the details of the preferred embodiment shown may be varied without departing from the spirit of my invention, as defined in the claims.

What I claim is:—

1. In a cutting tool, the combination of a shank having a recess therein to receive a cutting bit, the bit being welded to said shank in said recess, said bit being centrally divided into a half composed of a hard and relatively brittle cutting alloy and a half of a more elastic metal, the line of welding in said bit being within said recess.

2. In a cutting tool, a cutting bit, having a cutting portion composed of a hard brittle alloy and a non-cutting portion of a more elastic metal welded thereto, said bit being welded to the shank of said tool at both of the portions.

3. In combination, a cutting member and a holder, the cutting member being divided into a cutting portion of a hard brittle metal and a non-cutting portion of a more elastic metal, the said portions being welded to each other, the grain of the metal of said cutting portion being substantially parallel to the axis of the shank of the holder of said cutting member.

4. In combination, a cutting member and a holder, the cutting member being divided into a cutting portion of hard brittle metal and a non-cutting portion of a more elastic metal, the said portions being welded to each other, and to the shank of said holder, the grain of the metal of the cutting portion being substantially parallel to the axis of the shank of the holder of said cutting member.

5. In combination, a cutting member and holder, the cutting member being divided into a cutting portion of stellite and a non-cutting portion of steel, the said portions being welded to each other, the grain of the stellite being substantially parallel to the axis of the shank of said holder.

6. In combination, a cutting member and holder, the cutting member being divided into a cutting portion of stellite, and a non-cutting portion of steel, the said portions being welded to each other and to the shank of the holder, the grain of the stellite being substantially parallel to the axis of the shank of said holder.

In testimony whereof I hereunto affix my signature.

HAROLD FISH.